United States Patent
Wang et al.

(10) Patent No.: US 11,513,688 B2
(45) Date of Patent: Nov. 29, 2022

(54) SYSTEM AND METHOD FOR CONTINUOUSLY OFFLOADING INPUT-OUTPUT (IO) TRACES FROM A STORAGE SYSTEM

(71) Applicant: EMC IP Holding Company, LLC, Hopkinton, MA (US)

(72) Inventors: Wei Wang, Westborough, MA (US); Benjamin James Beauregard, Merrimack, NH (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/220,310

(22) Filed: Apr. 1, 2021

(65) Prior Publication Data
US 2022/0317875 A1    Oct. 6, 2022

(51) Int. Cl.
*G06F 3/06* (2006.01)

(52) U.S. Cl.
CPC ............. *G06F 3/061* (2013.01); *G06F 3/067* (2013.01); *G06F 3/0655* (2013.01)

(58) Field of Classification Search
CPC .... G06F 3/0649; G06F 3/0685; G06F 3/0605; G06F 3/061
See application file for complete search history.

(56) References Cited

U.S. PATENT DOCUMENTS 8,583,838 B1 *  11/2013  Marshak ............... G06F 3/0689 710/16

\* cited by examiner

*Primary Examiner* — Yong J Choe
(74) *Attorney, Agent, or Firm* — Brian J. Colandreo; Mark H. Whittenberger; Holland & Knight LLP

(57) ABSTRACT

A method, computer program product, and computing system for allocating a portion of a storage system for storing input/output (IO) traces, thus defining an IO trace storage tier. The plurality of IO traces may be stored within the IO trace storage tier. It may be determined whether at least a threshold number of IO traces are stored within the IO trace storage tier. In response to determining that at least the threshold number of IO traces are stored within the IO trace storage tier, at least a portion of the plurality of IO traces may be offloaded to a client computing device.

20 Claims, 11 Drawing Sheets

SYSTEM AND METHOD FOR CONTINUOUSLY OFFLOADING INPUT-OUTPUT (IO) TRACES FROM A STORAGE SYSTEM

BACKGROUND

Storing and safeguarding electronic content may be beneficial in modern business and elsewhere. Accordingly, various methodologies may be employed to protect and distribute such electronic content.

When testing and/or troubleshooting the processing of IO requests on a storage system, the storage system may be configured to generate IO traces. An IO trace may generally include information associated with the processing of an IO request on the storage system (e.g., a list of hardware and/or software components used to process the IO request, the originating client device, a description of the IO path, a timestamp of IO request arrival and processing, a total execution time, etc.). A user may determine how an IO request is processed by a storage system using the IO traces. However, conventional approaches to managing IO traces include dumping all IO traces accumulated within a storage system at one time. As such, the amount of IO traces or IO trace data dumped to a client computing device is limited by the storage system and it is difficult to control which portions of IO trace data to collect.

SUMMARY OF DISCLOSURE

In one example implementation, a computer-implemented method executed on a computing device may include, but is not limited to, allocating a portion of a storage system for storing input/output (IO) traces, thus defining an IO trace storage tier. The plurality of IO traces may be stored within the IO trace storage tier. It may be determined whether at least a threshold number of IO traces are stored within the IO trace storage tier. In response to determining that at least the threshold number of IO traces are stored within the IO trace storage tier, at least a portion of the plurality of IO traces may be offloaded to a client computing device.

One or more of the following example features may be included. Each IO trace of the plurality of IO traces may include information associated with processing an IO request on the storage system. The IO trace storage tier may be a ring buffer. Determining whether at least the threshold number of IO traces are stored within the IO trace storage tier may include defining a trace position within the ring buffer of the IO trace storage tier. The trace position may be updated within the ring buffer in response to storing the plurality of IO traces within the IO trace storage tier. Determining whether at least the threshold number of IO traces are stored within the IO trace storage tier may include defining a dump position within the ring buffer of the IO trace storage tier. The dump position may be updated within the ring buffer in response to offloading the at least a portion of the plurality of IO traces to the client computing device.

In another example implementation, a computer program product resides on a computer readable medium that has a plurality of instructions stored on it. When executed by a processor, the instructions cause the processor to perform operations that may include, but are not limited to, allocating a portion of a storage system for storing input/output (IO) traces, thus defining an IO trace storage tier. The plurality of IO traces may be stored within the IO trace storage tier. It may be determined whether at least a threshold number of IO traces are stored within the IO trace storage tier. In response to determining that at least the threshold number of IO traces are stored within the IO trace storage tier, at least a portion of the plurality of IO traces may be offloaded to a client computing device.

One or more of the following example features may be included. Each IO trace of the plurality of IO traces may include information associated with processing an IO request on the storage system. The IO trace storage tier may be a ring buffer. Determining whether at least the threshold number of IO traces are stored within the IO trace storage tier may include defining a trace position within the ring buffer of the IO trace storage tier. The trace position may be updated within the ring buffer in response to storing the plurality of IO traces within the IO trace storage tier. Determining whether at least the threshold number of IO traces are stored within the IO trace storage tier may include defining a dump position within the ring buffer of the IO trace storage tier. The dump position may be updated within the ring buffer in response to offloading the at least a portion of the plurality of IO traces to the client computing device.

In another example implementation, a computing system includes at least one processor and at least one memory architecture coupled with the at least one processor, wherein the at least one processor is configured to allocate a portion of a storage system for storing input/output (IO) traces, thus defining an IO trace storage tier. The at least one processor may be further configured to store a plurality of IO traces within the IO trace storage tier. The at least one processor may be further configured to determine whether at least a threshold number of IO traces are stored within the IO trace storage tier. The at least one processor may be further configured to, in response to determining that at least the threshold number of IO traces are stored within the IO trace storage tier, offload at least a portion of the plurality of IO traces to a client computing device.

One or more of the following example features may be included. Each IO trace of the plurality of IO traces may include information associated with processing an IO request on the storage system. The IO trace storage tier may be a ring buffer. Determining whether at least the threshold number of IO traces are stored within the IO trace storage tier may include defining a trace position within the ring buffer of the IO trace storage tier. The trace position may be updated within the ring buffer in response to storing the plurality of IO traces within the IO trace storage tier. Determining whether at least the threshold number of IO traces are stored within the IO trace storage tier may include defining a dump position within the ring buffer of the IO trace storage tier. The dump position may be updated within the ring buffer in response to offloading the at least a portion of the plurality of IO traces to the client computing device.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
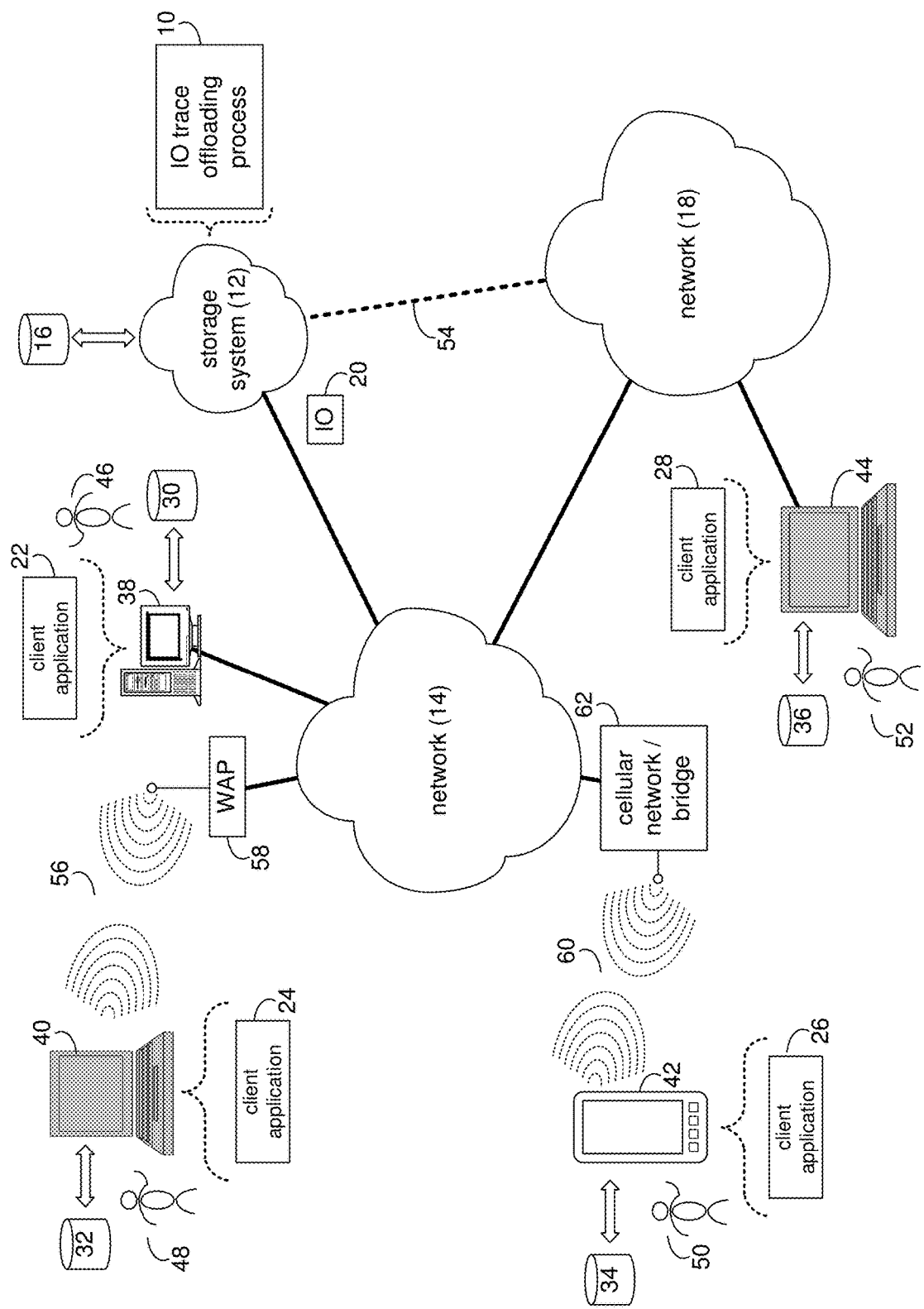
FIG. 1 is an example diagrammatic view of a storage system and a IO trace offloading process coupled to a distributed computing network according to one or more example implementations of the disclosure.

System Overview:

Referring to FIG. 1, there is shown IO trace offloading process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of IO trace offloading process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of IO trace offloading process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client computing devices 38, 40, 42, 44 (respectively), may be executed by one or more processors (not shown) and one or more memory architectures (not shown) incorporated into client computing devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client computing devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client computing devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client computing devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a IO trace offloading process, such as IO trace offloading process 10 of FIG. 1, may include but is not limited to, allocating a portion of a storage system for storing input/output (IO) traces, thus defining an IO trace storage tier. The plurality of IO traces may be stored within the IO trace storage tier. It may be determined whether at least a threshold number of IO traces are stored within the IO trace storage tier. In response to determining that at least the threshold number of IO traces are stored within the IO trace storage tier, at least a portion of the plurality of IO traces may be offloaded to a client computing device.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
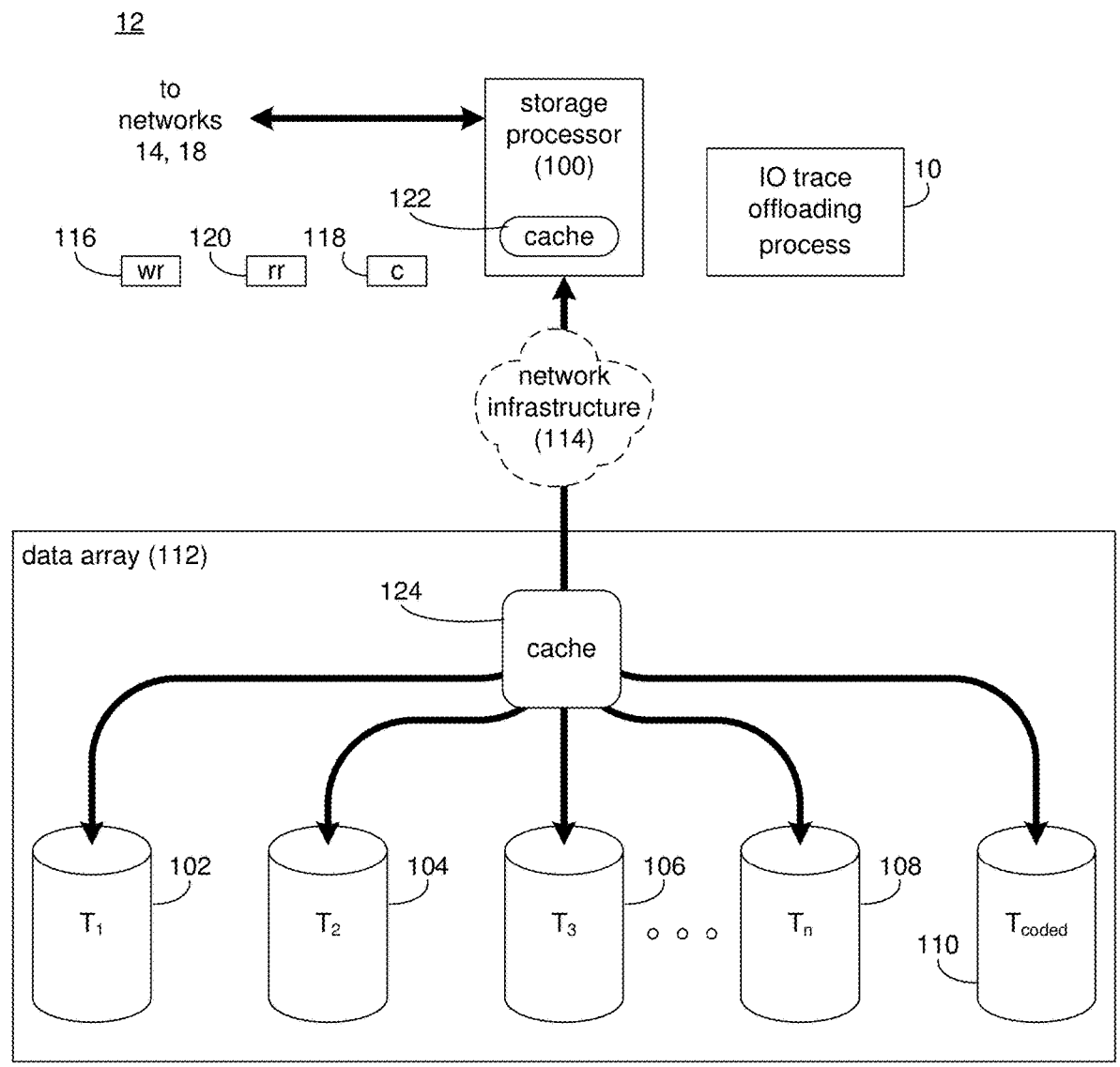
FIG. 2 is an example diagrammatic view of the storage system of FIG. 1 according to one or more example implementations of the disclosure.
Figure 3:
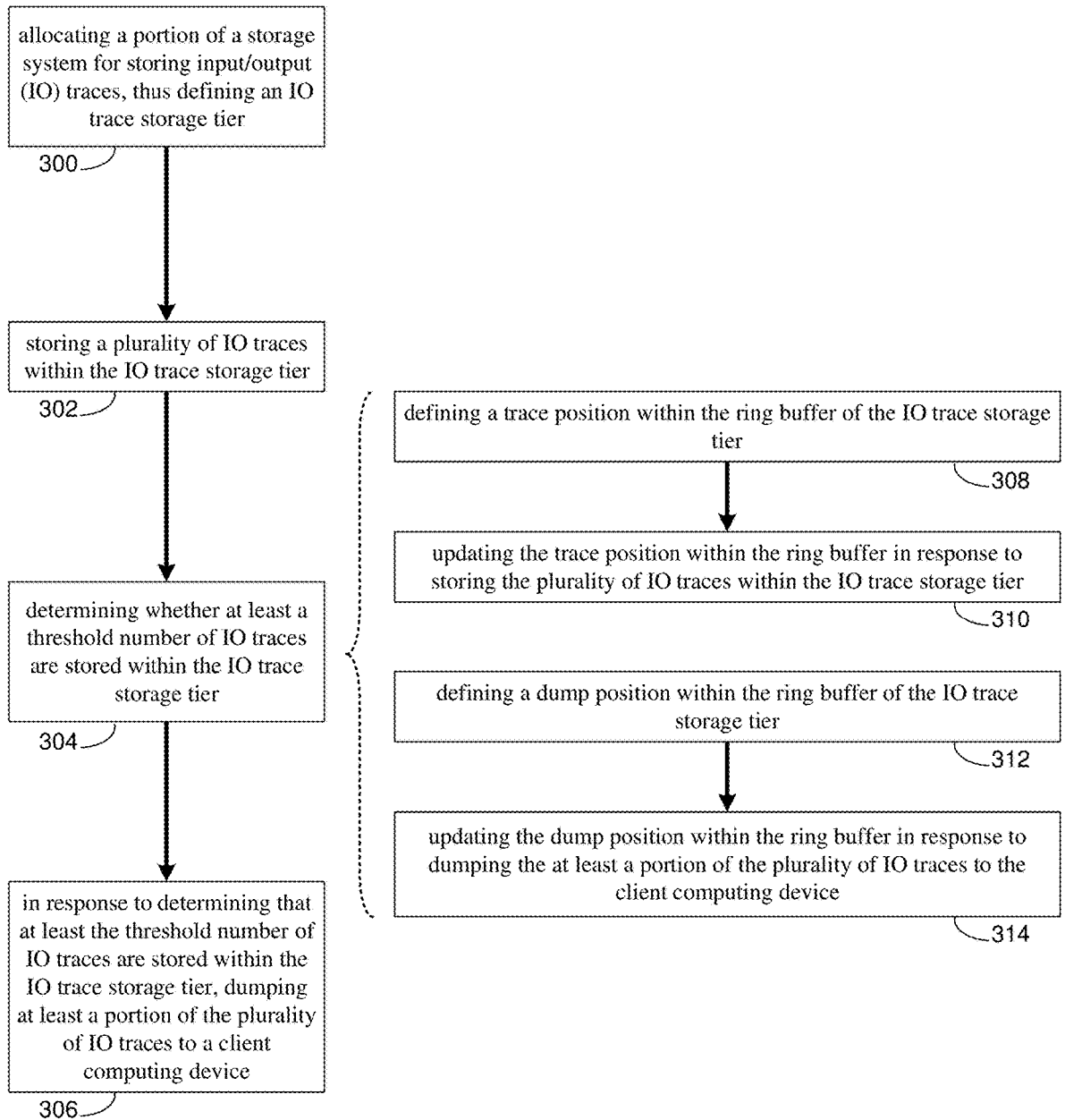
FIG. 3 is an example flowchart of IO trace offloading process according to one or more example implementations of the disclosure.

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of IO trace offloading process 10. The instruction sets and subroutines of IO trace offloading process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of IO trace offloading process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of IO trace offloading process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of IO trace offloading process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The IO Trace Offloading Process:

Referring also to the examples of FIGS. 3-11 and in some implementations, IO trace offloading process 10 may allocate 300 a portion of a storage system for storing input/output (IO) traces, thus defining an IO trace storage tier. The plurality of IO traces may be stored 302 within the IO trace storage tier. It may be determined 304 whether at least a threshold number of IO traces are stored within the IO trace storage tier. In response to determining that at least the threshold number of IO traces are stored within the IO trace storage tier, at least a portion of the plurality of IO traces may be offloaded 306 to a client computing device.

As will be discussed in greater detail below, implementations of the present disclosure may allow for continuous and substantially lossless offloading of IO traces from a storage system to a client computing device. For example, when testing and/or troubleshooting the processing of IO requests on a storage system, the storage system may be configured to generate IO traces. As will be discussed in greater detail below, an IO trace may generally include information associated with the processing of an IO request on the storage system (e.g., a list of hardware and/or software components used to process the IO request, the originating client device, a description of the IO path, a timestamp of IO request arrival and processing, a total execution time, etc.). In this manner, a user at a client computing device may determine how an IO request is processed by a storage system by using the IO trace received back from the storage system. Conventional approaches to managing IO traces include dumping all IO traces accumulated within a storage system to a client computing device at one time. As such, the amount of IO traces or IO trace data dumped to a client computing device is limited by the storage system and it is difficult to control which portions of IO trace data to collect. As will be discussed in greater detail below, IO trace offloading process 10 may allow for portions of a storage system to be allocated for offloading IO traces in a continuous and substantially lossless manner.

In some implementations, IO trace offloading process 10 may allocate 300 a portion of a storage system for storing input/output (IO) traces, thus defining an IO trace storage tier. As discussed above, conventional approaches to managing IO traces from a storage system include dumping all IO traces accumulated within a storage system at one time. This is limited to the amount of IO traces accumulated and may lead to a loss of IO traces during heavy IO periods and inefficient, wasteful CPU cycles to process IO traces during light IO periods.

In some implementations, IO trace offloading process 10 may allocate 300 a portion of a storage system (e.g., portion 400 of data array 112 of storage system 12) as an IO trace storage tier (e.g., IO trace storage tier 402). In some implementations, the size of IO trace storage tier 402 may be a default, predefined value and/or may be user-defined (e.g., via a user interface). In some implementations, the size of IO trace storage tier 402 may be dynamic and may be adjusted based upon, at least in part, predicted IO loads for storage system 12. Accordingly, it will be appreciated that IO trace offloading process 10 may allocate 300 any sized portion of storage system 12 for IO trace storage tier 402, within the scope of the present disclosure.

In some implementations, each IO trace of the plurality of IO traces may include information associated with processing an IO request on the storage system. As discussed above and in some implementations, IO trace 404 may include information associated with an IO request (e.g., IO request 20) sent by a client computing device (e.g., storage processor 100 and/or client computing devices 38, 40, 42, 44). For example, IO trace 404 may include a list of hardware and/or software components used to process the IO request, the originating client computing device, a description of the IO path, a timestamp of IO request arrival and processing, a total execution time, etc. While examples of information associated with an IO request that may be included in IO trace 404 have been provided, it will be appreciated that these are for example purposes only and that any information associated with IO request may be included or referenced by an IO trace within the scope of the present disclosure.

Figure 4:
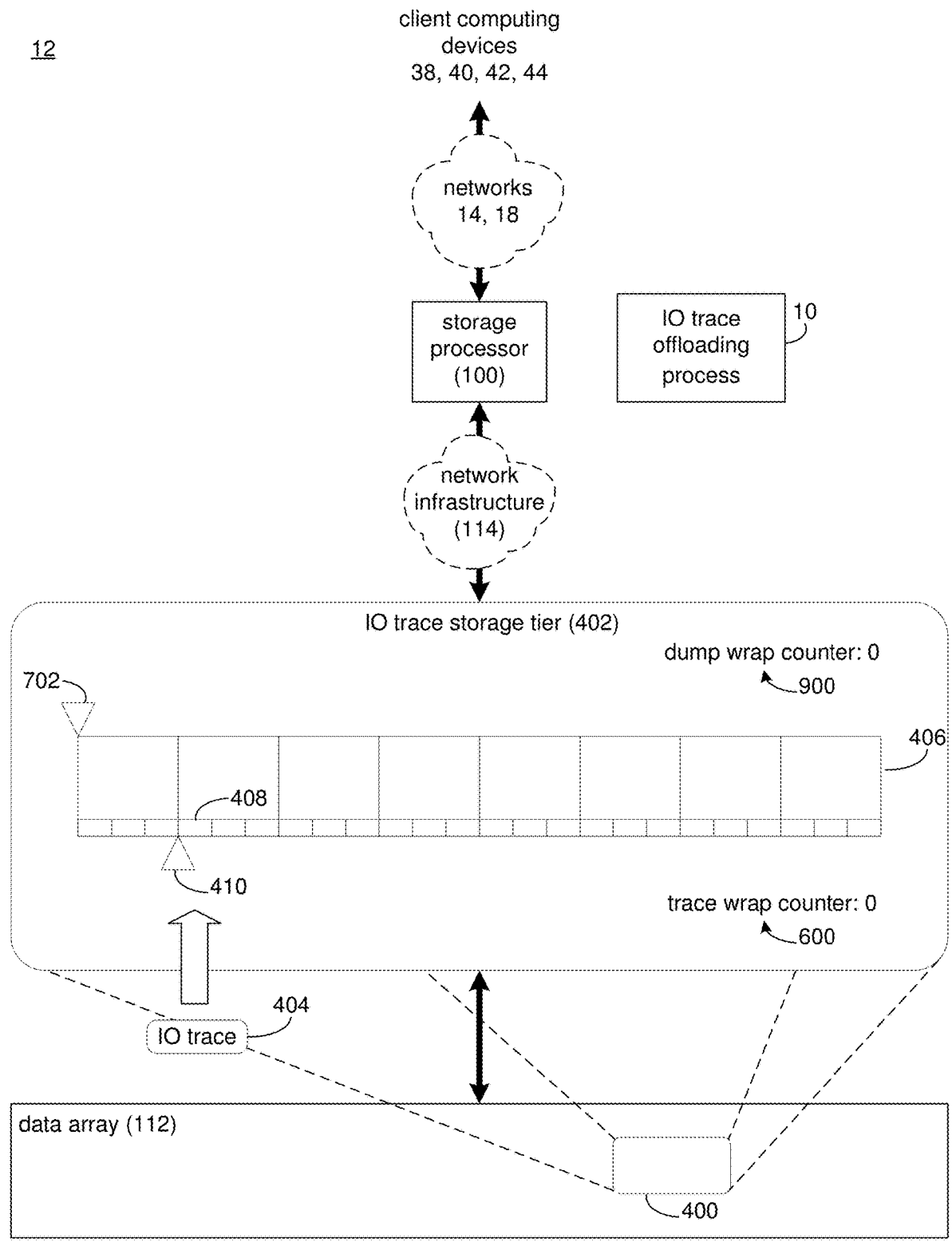
FIGS. 4-11 are example diagrammatic views of the storage system of FIG. 1 according to one or more example implementations of the disclosure.

In some implementations, the IO trace storage tier may be a ring buffer. As is known in the art, a ring buffer may generally include a data structure of a defined capacity that is configured to store data. Data may be added to the circular ring buffer until the circular ring buffer is full. Once the circular ring buffer is filled, new data may overwrite the oldest data previously written to the circular ring buffer. In this manner, the circular ring buffer may continuously write new data despite a limited size by overwriting old data with new data. However, it will be appreciated that other types of buffers may be used within the scope of the present disclosure. As shown in the example of FIG. 4, ring buffer 406 may be configured to write data (e.g., from left to right) until ring buffer 406 is full. IO trace offloading process 10 may then overwrite the oldest data (e.g., the leftmost portion, as new data is added from left to right). As will be discussed in greater detail below, when ring buffer 406 is full and additional data is added that overwrites the oldest data, this may be referred to as "wrapping" from the end of ring buffer 406 back to the beginning of ring buffer 406. In some implementations and as will be discussed in greater detail below, by utilizing ring buffer 406 as IO trace storage tier 402, IO trace offloading process 10 may continuously store and offload IO traces.

In some implementations, IO trace offloading process 10 may store 302 a plurality of IO traces within the IO trace storage tier. For example and referring again to the example of FIG. 4, suppose that, in response to IO 20 received from client computing devices 38, 40, 42, 44, storage system 12 processes IO 20 on data array 112. In some implementations, client computing devices 38, 40, 42, 44 may, via storage processor 100, activate or enable the generation of IO traces for each IO received by storage system 12 (e.g., via a user interface or other configuration of storage system 12). In this example and in response to processing IO 20 while IO trace generation is enabled, storage system 12 may generate IO trace 404 including information associated with the processing of IO 20 on storage system 12.

In some implementations, IO trace offloading process 10 may receive IO trace 404 from another portion of storage system 12 (e.g., data array 112 or storage processor 100). While FIG. 4 shows IO trace storage tier 402 within data array 112, it will be appreciated that IO trace storage tier 402 may be positioned within any portion of storage system 12. For example, IO trace storage tier 402 may be positioned within and allocated a portion of storage space from e.g., storage processor 100. In this example and as shown in FIG. 4, IO trace offloading process 10 may store 302 IO trace 404 within ring buffer 406. While an example of one IO trace being stored 302 within IO trace storage tier 402 has been described, it will be appreciated that any number of IO traces may be stored within IO trace storage tier 402 within the scope of the present disclosure. In this manner, IO trace offloading process 10 may receive and store 302 a plurality of IO traces within IO trace storage tier 402.

In some implementations, IO trace offloading process 10 may determine 304 whether at least a threshold number of IO traces are stored within the IO trace storage tier. As discussed above and in some implementations, IO trace offloading process 10 may continuously receive and store 302 IO traces within IO trace storage tier 402. In some implementations and in contrast to conventional IO trace management techniques, IO trace offloading process 10 may define a threshold number of IO traces or a threshold storage space associated with storing IO traces for initiating offloading subsets or portions of the plurality of IO traces stored within IO trace storage tier 402 to client computing devices 38, 40, 42, 44.

In some implementations, determining 304 whether at least a threshold number of IO traces are stored within the IO trace storage tier may be initiated by the one or more client computing devices (e.g., one of client computing devices 38, 40, 42, 44). For example, client computing device 38 may enable IO trace generation for IO requests sent from client computing device 38. In this example and in response to receiving one or more IO requests from client computing device 38, storage system 12 may generate one or more IO traces (e.g., IO trace 404). In some implementations, IO trace offloading process 10 may store these IO traces in IO trace storage tier 402. Client computing device 38 may be configured to iteratively request or poll IO trace storage tier 402 to determine whether at least a threshold number of IO traces are stored within the IO trace storage tier. As will be discussed in greater detail below, in response to determining that at least the threshold number of IO traces are stored within IO trace storage tier 402, IO trace offloading process 10 may offload 306 or dump at least a portion of the plurality of IO traces from IO trace storage tier 402 to client computing device 38.

Figure 5:
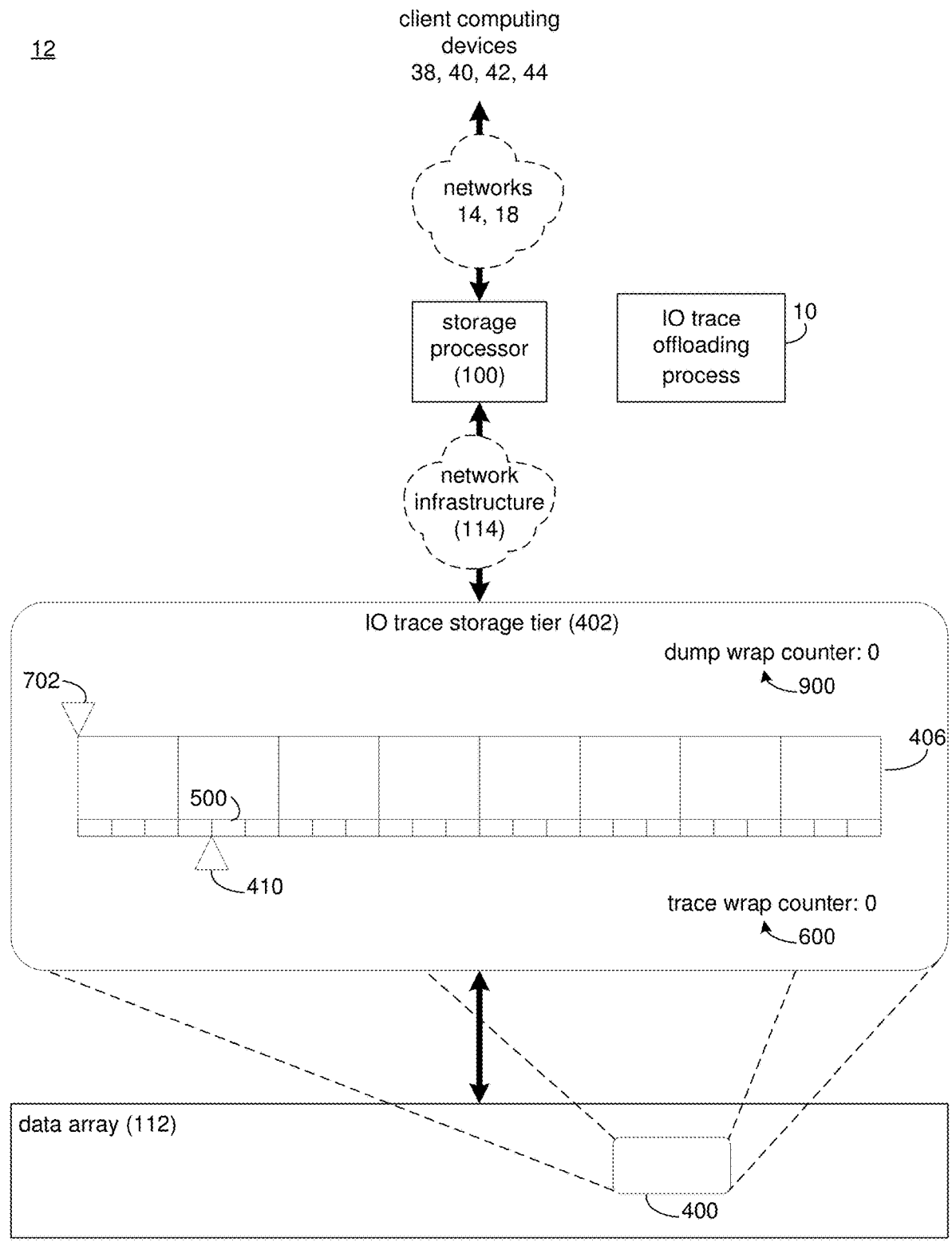

In some implementations, determining 304 whether at least the threshold number of IO traces are stored within the IO trace storage tier may include defining 308 a trace position within the ring buffer of the IO trace storage tier. A trace position may generally include an indication or pointer within a ring buffer indicating the location of the most recent IO trace stored within the ring buffer. With the trace position, IO trace offloading process 10 may determine where the next IO trace will be stored in the ring buffer. For example and referring to FIGS. 4-5, suppose that in response to storing 302 IO trace 404 within ring buffer 406, IO trace offloading process 10 records IO trace as being the e.g., fourth IO trace stored in ring buffer 406 (e.g., represented by entry 408 of ring buffer 406). In this example, IO trace offloading process 10 may define trace position 410 as the location of the most recent IO trace stored in ring buffer 406. Accordingly, IO trace offloading process 10 may determine that the next IO trace will be stored in the next entry (e.g., entry 500 as shown in FIG. 5) of ring buffer 406 based upon trace position 410.

In some implementations, IO trace offloading process 10 may update 310 the trace position within the ring buffer in response to storing 302 the plurality of IO traces within the IO trace storage tier. Referring again to FIG. 5 and in some implementations, IO trace offloading process 10 may continuously update 310 trace position 410 within ring buffer 406 in response to storing 302 the plurality of IO traces within IO trace storage tier 402. For example and continuing with the above example, in response to storing 302 IO trace 404 in entry 408 as shown in FIG. 4, IO trace offloading process 10 may update 310 trace position 410 to indicate that the next IO trace will be stored in entry 500.

In some implementations, determining 304 whether at least the threshold number of IO traces are stored within the IO trace storage tier may include defining a trace wrap counter. A trace wrap counter may generally include a counter configured to record the number of times the trace position "wraps" ring buffer 406 as IO traces are stored in IO trace storage tier 402. For example and referring also to FIG. 6, suppose that IO trace offloading process 10 receives and stores 302 a plurality of IO traces such that ring buffer 406 is completely full (i.e., the most recent IO trace is stored in entry 408 of ring buffer 406 and trace position 410 is updated to indicate that entry 500 of ring buffer 406 will store the next IO trace). In this example, IO trace offloading process 10 may define trace wrap counter 600 from "0" to "1" as the trace position has wrapped around ring buffer 406 one time.

In some implementations, determining 304 whether at least the threshold number of IO traces are stored within the IO trace storage tier may include defining 312 a dump position within the ring buffer of the IO trace storage tier. A dump position may generally include an indication or pointer within ring buffer 406 indicating the location of the most recently offloaded portion of ring buffer 406 to the client computing devices. As will be discussed in greater detail below, IO trace offloading process 10 may dump or offload IO traces from IO trace storage tier 402 to one or more client computing devices (e.g., client computing devices 38, 40, 42, 44). With the dump position, IO trace offloading process 10 may determine the next portion of IO traces of ring buffer 406 to offload to a client computing device.

For example and referring also to FIGS. 7-8 and as will be discussed in greater detail below, suppose that, in response to determining 304 that at least the threshold number of IO traces are stored within the IO trace storage tier, IO trace offloading process 10 records a portion of ring buffer 406 (e.g., represented by portion 700 of ring buffer 406) as being the last portion of ring buffer 406 offloaded to a client computing device. In this example, IO trace offloading process 10 may define dump position 702 as the location of the most recently offloaded portion of ring buffer 406. Accordingly, IO trace offloading process 10 may determine that the next portion(s) of IO trace storage tier 402 to be offloaded will include portions of ring buffer 406 after dump position 702.

In some implementations, IO trace offloading process 10 may update 314 the dump position within the ring buffer in response to offloading the at least a portion of the plurality of IO traces to the client computing device. Referring again to FIGS. 7-8 and as will be discussed in greater detail below, IO trace offloading process 10 may offload 306 or dump portion 700 of IO trace storage tier 402 to one or more client computing devices (e.g., client computing devices 38, 40, 42, 44). In response, IO trace offloading process 10 may update 314 dump position 700 as shown in FIG. 8 to indicate which portion(s) of IO trace storage tier has been dumped or offloaded to one or more client computing devices (e.g., client computing devices 38, 40, 42, 44).

In some implementations, determining 304 whether at least the threshold number of IO traces are stored within the IO trace storage tier may include defining a dump wrap counter. A dump wrap counter may generally include a counter configured to record the number of times the dump position "wraps" ring buffer 406 as IO traces are offloaded from IO trace storage tier 402. For example and referring also to FIG. 9, suppose that IO trace offloading process 10 dumps at least a portion of the plurality of IO traces from IO trace storage tier 402 such that the dump position wraps from the end of ring buffer 40 and back to the beginning of ring buffer 406. In this example, IO trace offloading process 10 may define dump wrap counter 900 from "0" to "1" as dump position 702 has wrapped around ring buffer 406 one time.

In some implementations, IO trace offloading process 10 may determine 304 whether at least a threshold number of IO traces are stored within the IO trace storage tier based upon, at least in part, the trace position, the trace wrap counter, the dump position, and/or the dump wrap counter. For example, IO trace offloading process 10 may define a threshold number of IO traces and/or a threshold amount or percentage of IO trace storage tier 402 to determine when to offload at least a portion of the plurality of IO traces to one or more client computing devices (e.g., client computing devices 38, 40, 42, 44). As discussed above and in some implementations, the threshold number of IO traces may be a default value (e.g., a default percentage of the total capacity of IO trace storage tier 402, a default number of IO traces, etc.); may be user-defined (e.g., via a user interface); and/or may be automatically or dynamically defined (e.g., by IO trace offloading process 10) to address changes in IO trace loads.

In one example, IO trace offloading process 10 may compare the trace position and the dump position to determine whether at least a threshold number of IO traces are stored within the IO trace storage tier. For example and referring again to FIG. 7, suppose that trace position 410 indicates that e.g., four IO traces are stored within IO trace storage tier 402 (e.g., trace position is at position "4") and that dump position 702 indicates that no IO traces have been offloaded (e.g., dump position is at position "0"). Suppose, for example purposes only, that the IO trace threshold for offloading IO traces is e.g., three IO traces. In other words, at least three new IO traces are to be stored within IO trace storage tier 402 before offloading the new IO traces to client computing devices 38, 40, 42, 44. In this example, IO trace offloading process 10 may determine whether or not at least a threshold number of IO traces are stored within the IO trace storage tier by e.g., subtracting the dump position from the trace position. In this example, IO trace offloading process 10 may determine that the IO trace threshold (e.g., at least three IO traces) is met (e.g., trace position at position "4" minus dump position at position "0" equals four new IO traces). In this example and as will be discussed in greater detail below, IO trace offloading process 10 may offload 306 or dump at least a portion of the plurality of IO traces (e.g., portion 700 including IO traces 704, 706, 708) to one or more client computing devices (e.g., client computing devices 38, 40, 42, 44). As will be discussed in greater detail below, the IO trace threshold may be defined by a predefined number of, or "chunk" of, IO traces that are offloaded to a client computing device at one time (e.g., portion 700).

In another example, IO trace offloading process 10 may compare the trace position, the trace wrap counter, the dump position, and the dump wrap counter to determine 304 whether at least a threshold number of IO traces are stored within the IO trace storage tier. In some implementations and as discussed above, the IO trace threshold may generally include a predefined number of IO traces that are offloaded to a client computing device at one time. However, it will be appreciated that the IO trace threshold may be defined to be any value within the scope of the present disclosure. For the following example, suppose that IO trace threshold is e.g., three IO traces. IO trace offloading process 10 may compare trace position, the trace wrap counter, the dump position, and the dump wrap counter to the IO trace threshold as shown below in Equation 1:

$$\text{trace position} - \text{dump position} + (\text{trace wrap count} - \text{dump wrap count}) * \text{IO trace storage tier capacity} > \text{IO trace threshold} \qquad (1)$$

Figure 6:
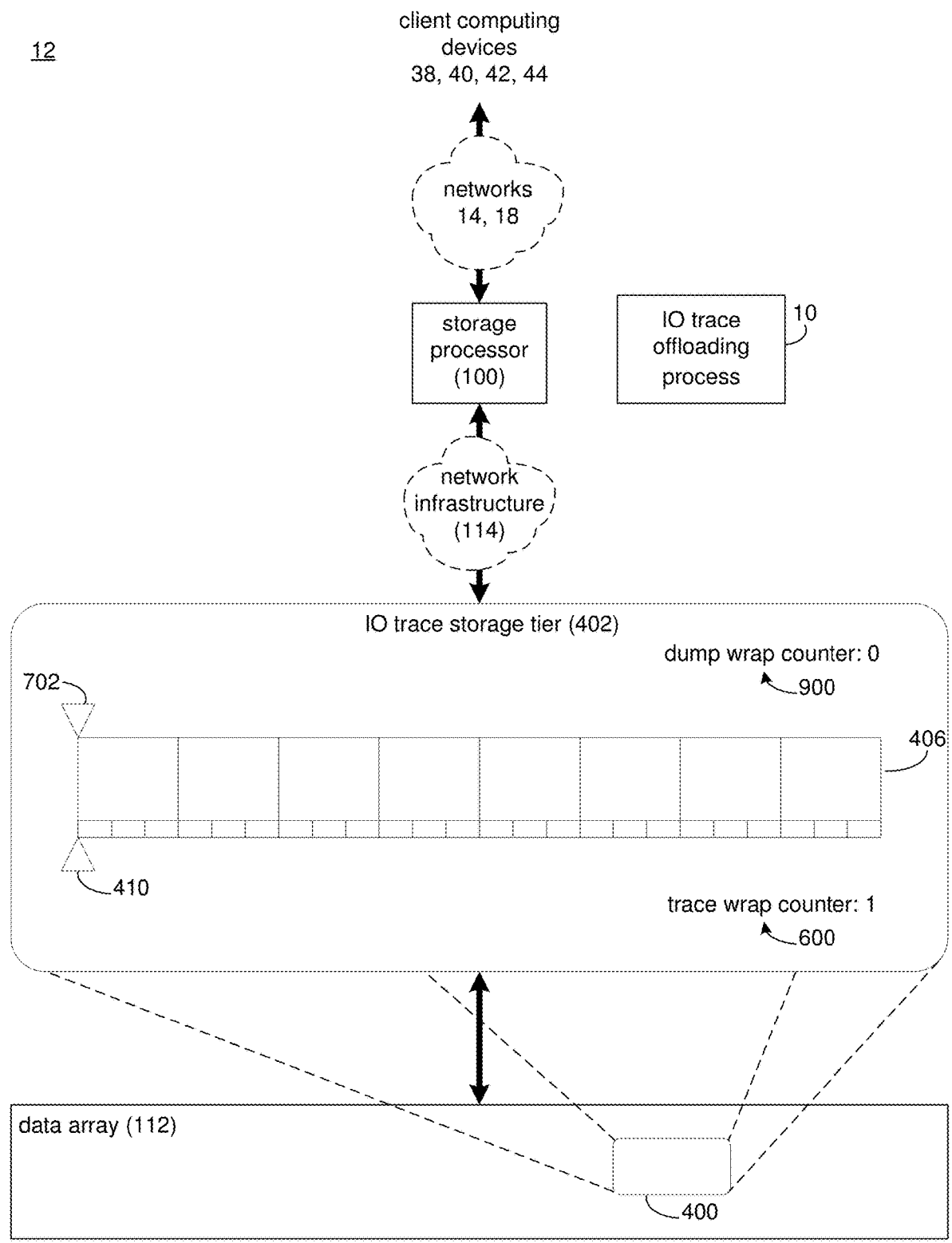

As shown in the example of FIG. 6, suppose that trace position 410 is at position "0", dump position 702 is at position "0", trace wrap counter 600 is at "1" wrap count, and that dump wrap counter 900 is at "0" wrap count. In this example, IO trace offloading process 10 may determine that the result of the left side of Equation 1 is "24" (i.e., 0−0+(1−0)*24>3). As such, IO trace offloading process 10 may determine that, for this example, at least a threshold number of IO traces are stored within the IO trace storage tier and IO trace offloading process 10 may offload 306 at least a portion of the plurality of IO traces to one or more client computing devices.

Figure 8:
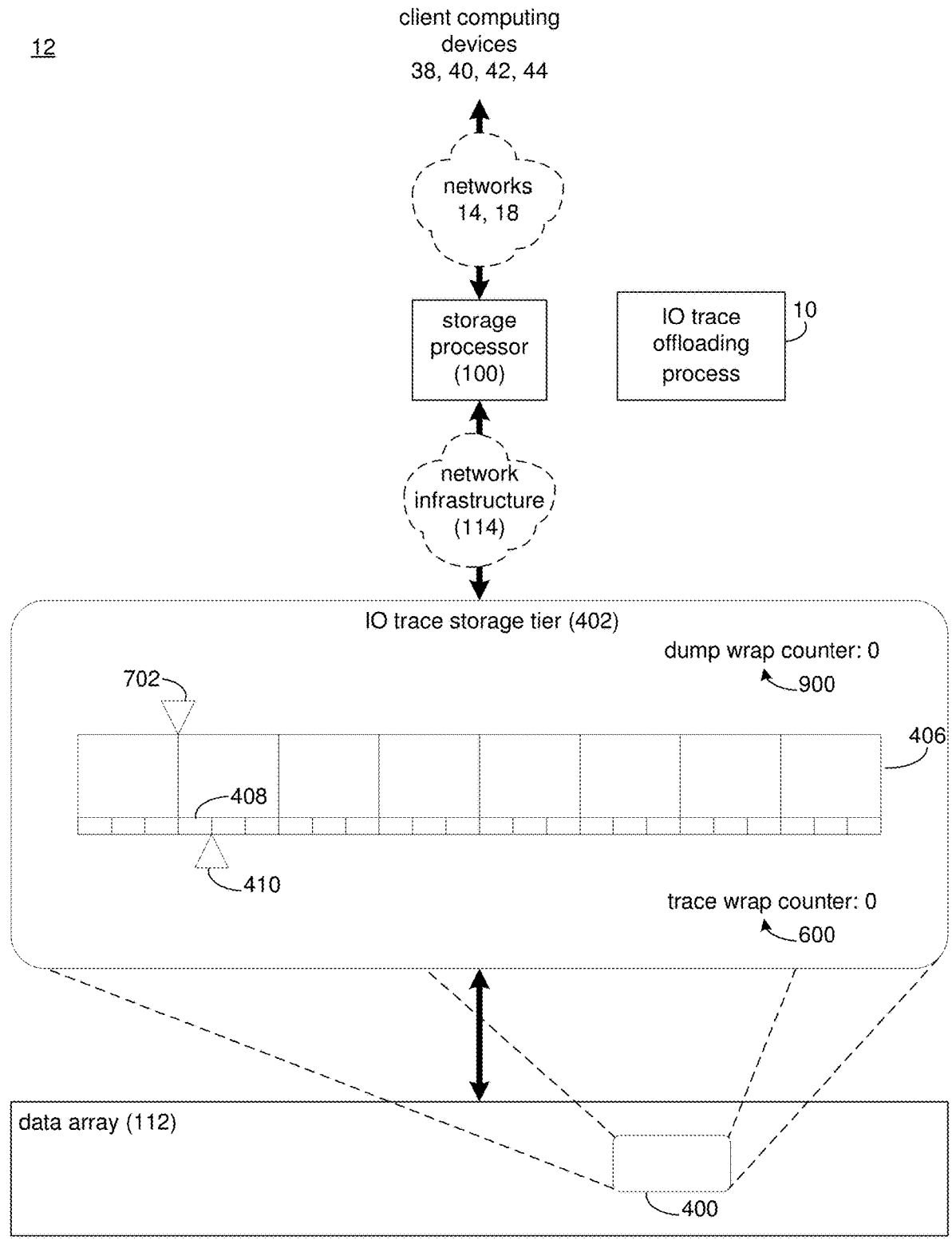
Figure 9:
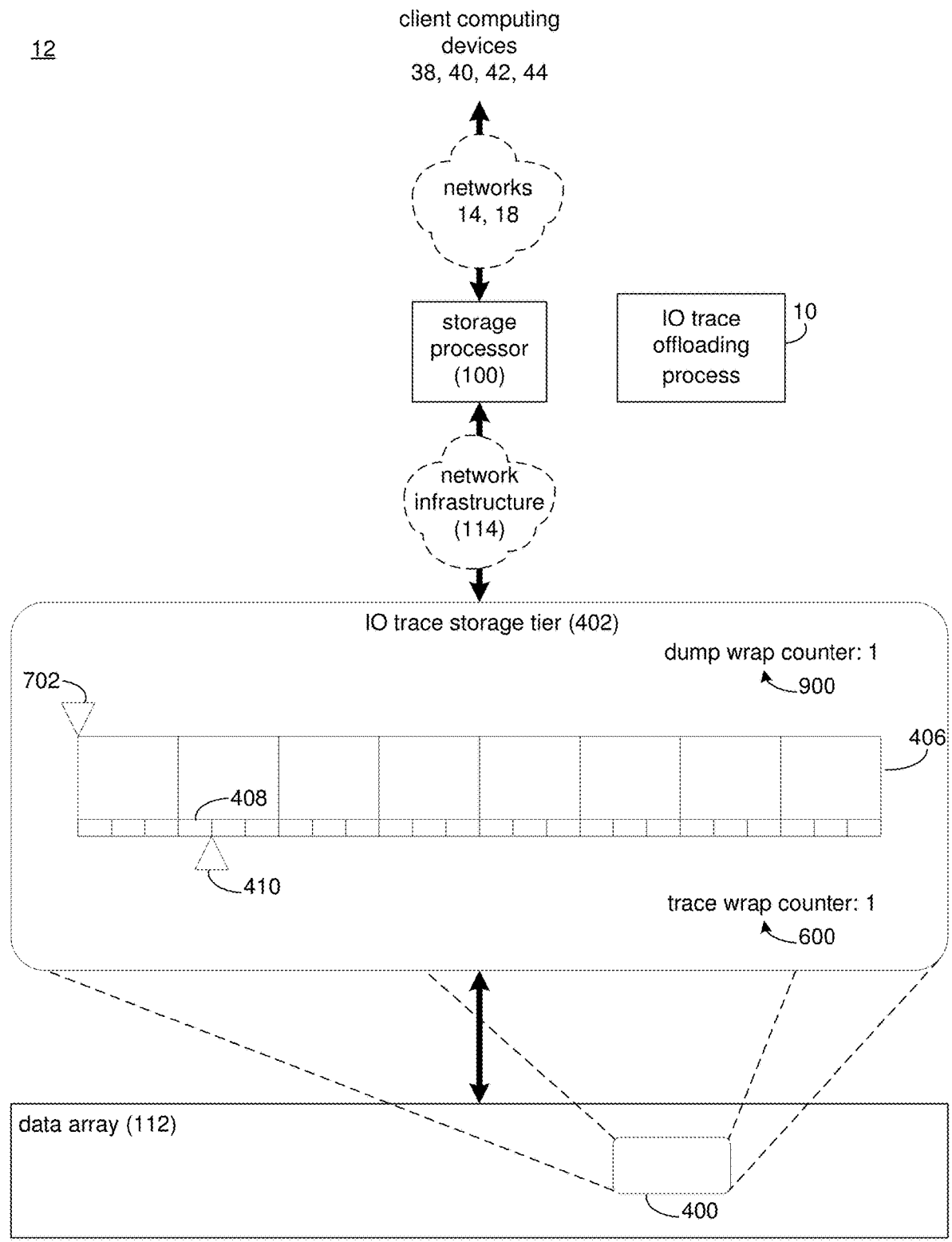

In another example, suppose that as shown in FIG. 8, trace position 410 is at position "4", dump position 702 is at position "3", trace wrap counter 600 is at "0" wrap count, and that dump wrap counter 900 is at "0" wrap count. In this example, IO trace offloading process 10 may determine that the result of the left side of Equation 1 is "1" (i.e., 1−0+(0−0)*24>3). As such, IO trace offloading process 10 may determine that, for this example, at least a threshold number of IO traces are not stored within the IO trace storage tier. Accordingly, IO trace offloading process 10 may not offload any IO traces to one or more client computing devices.

Figure 10:
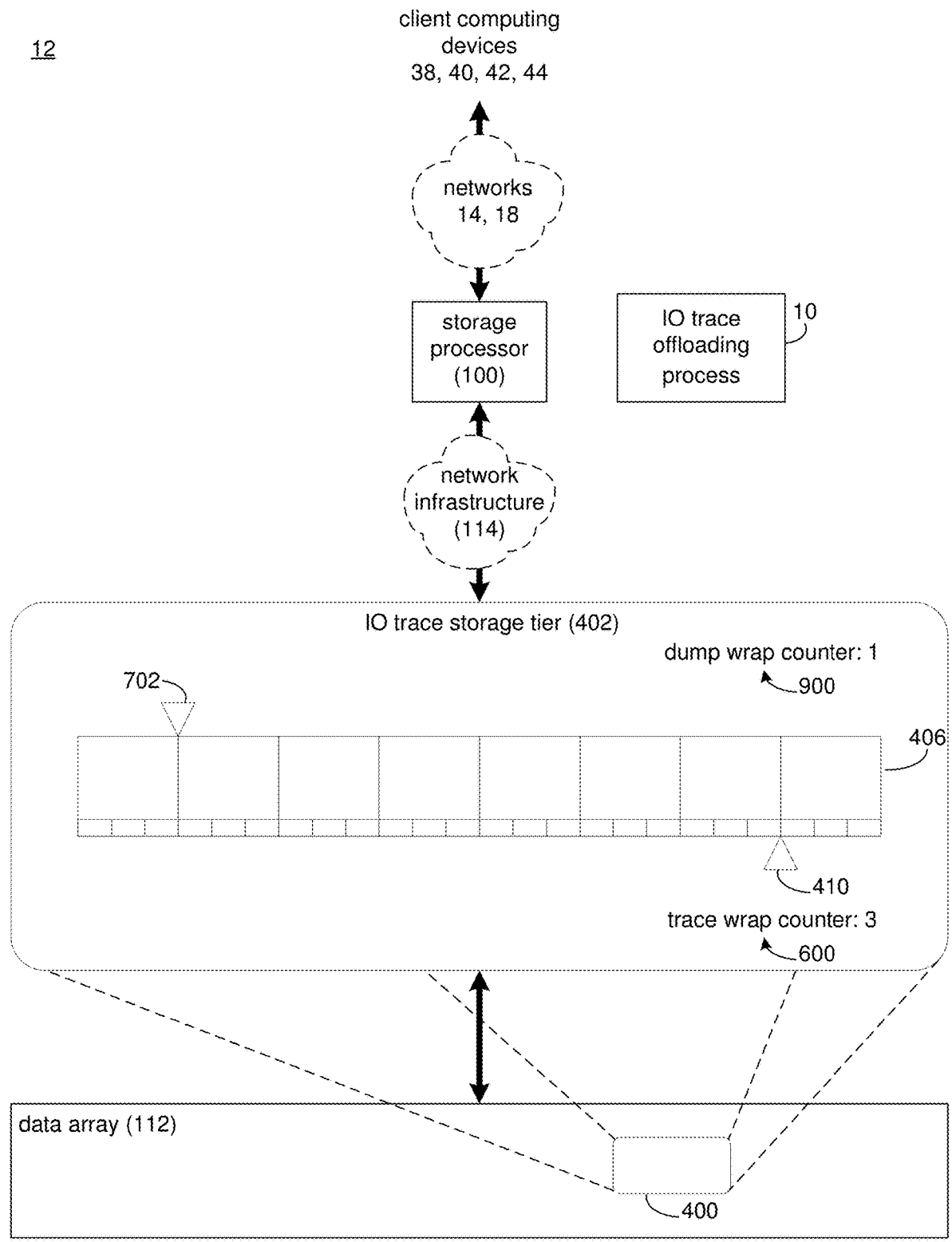
Figure 11:
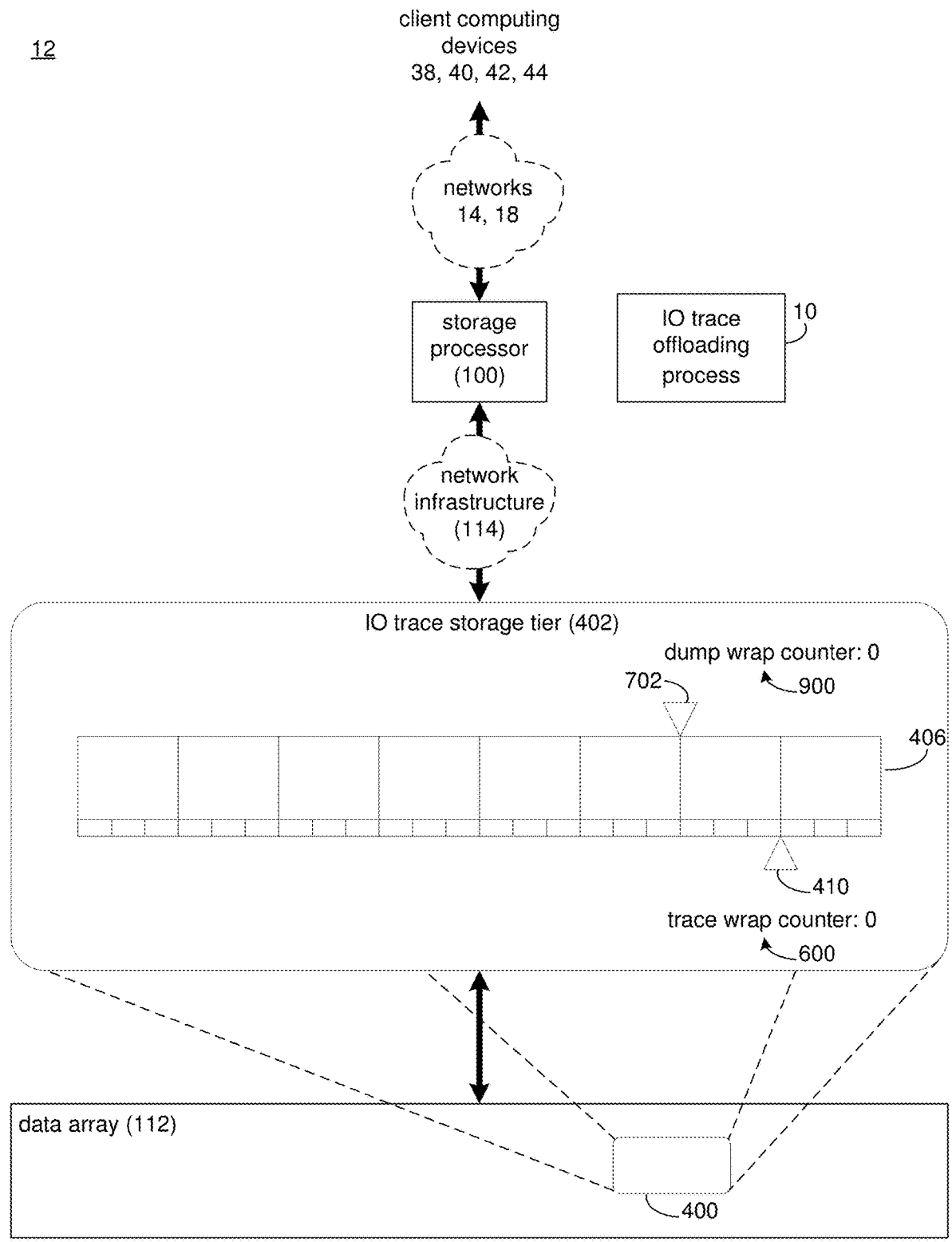

In another example and referring also to FIG. 10, suppose that trace position 410 is at position "21", dump position 702 is at position "2", trace wrap counter 600 is at "3" wrap count, and that dump wrap counter 900 is at "1" wrap count. In this example, IO trace offloading process 10 may determine that the result of the left side of Equation 1 is "42" (i.e., 21−3+(2−1)*24). In this example, IO trace offloading process 10 may determine that a number of IO traces may be lost (e.g., as trace position 410 has wrapped around ring buffer 406 far ahead of dump position 702). Accordingly, IO trace offloading process 10 may "skip" dump position 702 ahead to reduce the loss of further IO traces. For example and in response to determining that the comparison of the trace position, the dump position, the trace wrap counter, and the dump wrap counter of the left side of Equation 1 is less than e.g., the IO trace storage tier capacity, IO trace offloading process 10 may move dump position 702 to a position within a threshold distance of trace position 410. In some implementations, this threshold distance may be referred to as the "skip" threshold. In some implementations, the skip threshold may be predefined, user-defined, and/or automatically defined by IO trace offloading process 10. For example, suppose that the skip threshold is e.g., three. In this example, IO trace offloading process 10 may move dump position 702 to position "18" (e.g., 21−3) and may reset the trace wrap counter and the dump wrap counter. Accordingly, by skipping dump position 702 to a position within the skip threshold of trace position 410, IO trace offloading process 10 may avoid losing IO traces going forward.

In some implementations and in response to determining 304 that at least the threshold number of IO traces are stored within the IO trace storage tier, IO trace offloading process 10 may offload 306 at least a portion of the plurality of IO traces to a client computing device. In some implementations, IO trace offloading process 10 may offload 306 a predefined amount of IO traces and/or a predefined amount of capacity of IO trace storage tier 402. For example, the predefined amount of traces and/or predefined amount of capacity of IO trace storage tier 402 may generally be referred to as a "chunk" of IO trace storage tier 402 and may be a default amount, a user-defined amount, and/or an automatically defined amount.

Figure 7:
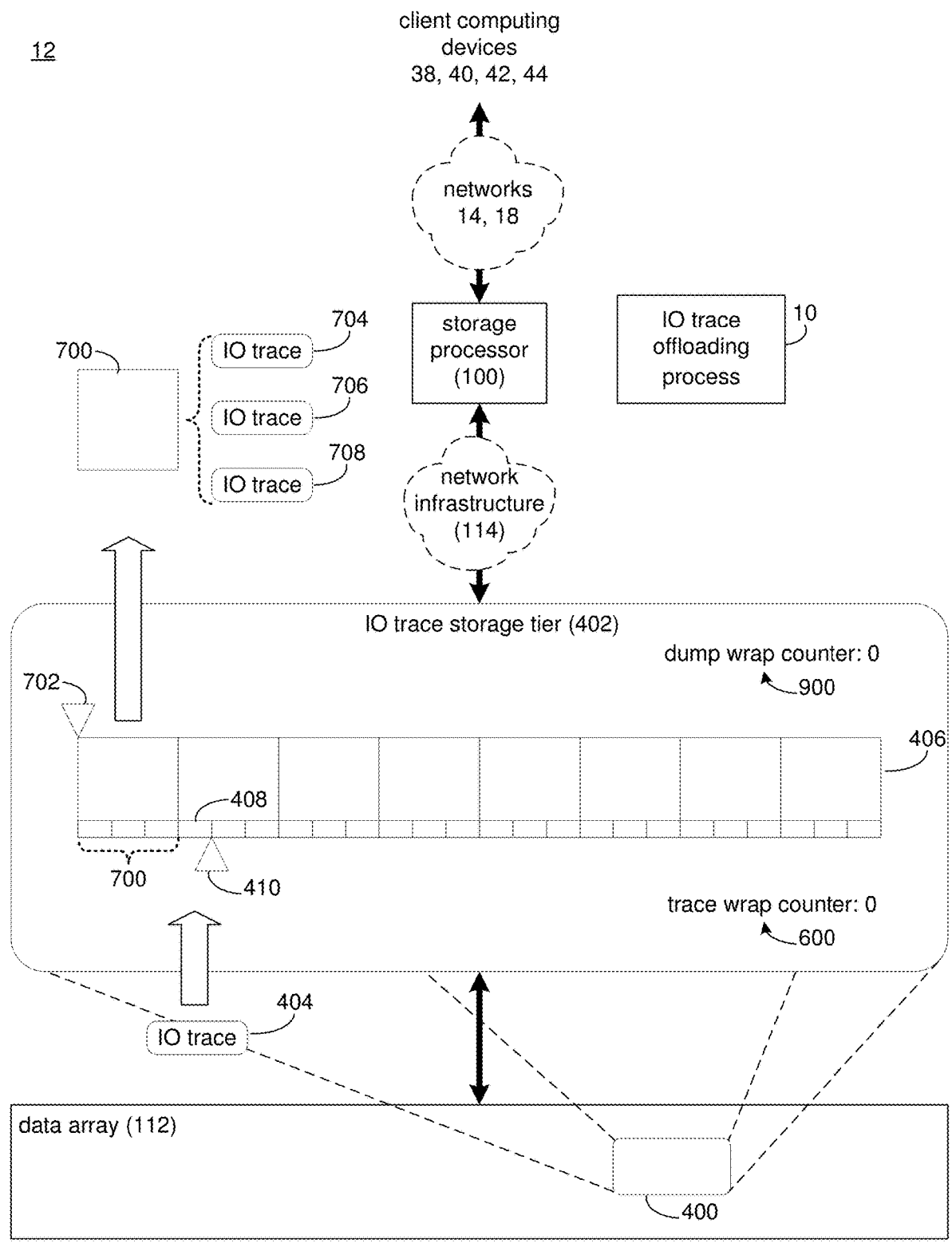

Referring again to the example of FIG. 7 and in response to determining 304 that at least the threshold number of IO traces are stored within the IO trace storage tier 402, IO trace offloading process 10 may offload 306 or dump at least a portion (e.g., portion or chunk 700) of the plurality of IO traces stored in IO trace storage tier 402 to one or more client computing devices (e.g., client computing devices 38, 40, 42, 44). In this example, portion 700 may include e.g., three IO traces (e.g., IO traces 704, 706, 708). While an example of offloading a e.g., a single portion with e.g., three IO traces has been described above, it will be appreciated that any number of, or size of, portions may be offloaded within the scope of the present disclosure. In some implementations, offloading 306 the at least a portion of the plurality of IO traces stored in IO trace storage tier 402 to one or more client computing devices may include offloading 306 the at least a portion of the plurality of IO traces stored in IO trace storage tier 402 to any storage area accessible to IO trace offloading process 10. For example, IO trace offloading process 10 may receive a destination for offloading 306 the at least a portion of the plurality of IO traces. In some implementations, the destination may be a client computing device and/or a storage area accessible to IO trace offloading process 10. Accordingly, it will be appreciated that IO trace offloading process 10 may offload 306 the at least a portion of the IO traces to any storage area within the scope of the present disclosure.

In some implementations, the one or more client computing devices (e.g., client computing device 38, 40, 42, 44) may monitor their respective local disk capacity and may pause offloading when their local disk capacity is equal to or above a predefined IO trace threshold storage capacity. For example, suppose client computing device 38 has a predefined IO trace threshold storage capacity and that the predefined IO trace threshold storage capacity has been exceeded. Accordingly, client computing device 38 may pause or cancel further IO trace offloading until client computing device 38 requests additional IO trace offloads (e.g., in response to client computing device 38 increasing the local disk capacity for storing IO traces).

In some implementations, IO trace offloading process 10 may mitigate the possible situation where IO traces may be lost by allocating or reallocating IO trace storage tier 402 with sufficient storage capacity to buffer peak IO loads, by disabling unnecessary traces from certain datapath layers, and/or by ensuring that there is sufficient local disk capacity on the one or more client computing devices for receiving IO traces from the IO trace storage tier. In some implementations, IO trace offloading process 10 may specify, whether to compress offloaded IO traces and files on the client computing device, how long the offloading of IO traces is enabled for a particular client computing device, and whether to delete IO traces from the IO trace storage tier that are older than a specified "age". For example, these features may be defined by the client computing device (e.g., via various user interfaces) and communicated to the storage system. In this manner, IO trace offloading process 10 may allow for a continuous and substantially lossless offloading of IO traces from a storage system to one or more client computing devices.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    allocating a portion of a storage system for storing input/output (TO) traces, thus defining an IO trace storage tier, wherein allocating the IO trace storage tier includes adjusting a size of the IO trace storage tier based upon, at least in part, one or more predicted IO loads for the storage system;
    storing a plurality of IO traces within the IO trace storage tier;
    determining whether at least a threshold number of IO traces are stored within the IO trace storage tier; and
    in response to determining that at least the threshold number of IO traces are stored within the IO trace storage tier, offloading at least a portion of the plurality of IO traces to a client computing device that provided an IO request to the storage system.

2. The computer-implemented method of claim 1, wherein each IO trace of the plurality of IO traces includes information associated with processing an IO request on the storage system.

3. The computer-implemented method of claim 1, wherein the IO trace storage tier is a ring buffer.

4. The computer-implemented method of claim 3, wherein determining whether at least the threshold number of IO traces are stored within the IO trace storage tier includes defining a trace position within the ring buffer of the IO trace storage tier.

5. The computer-implemented method of claim 4, further comprising:

updating the trace position within the ring buffer in response to storing the plurality of IO traces within the IO trace storage tier.

6. The computer-implemented method of claim 3, wherein determining whether at least the threshold number of IO traces are stored within the IO trace storage tier includes defining a dump position within the ring buffer of the IO trace storage tier.

7. The computer-implemented method of claim 6, further comprising:
updating the dump position within the ring buffer in response to offloading the at least a portion of the plurality of IO traces to the client computing device.

8. A computer program product residing on a non-transitory computer readable medium having a plurality of instructions stored thereon which, when executed by a processor, cause the processor to perform operations comprising:
allocating a portion of a storage system for storing input/output (TO) traces, thus defining an IO trace storage tier, wherein allocating the IO trace storage tier includes adjusting a size of the IO trace storage tier based upon, at least in part, one or more predicted IO loads for the storage system;
storing a plurality of IO traces within the IO trace storage tier;
determining whether at least a threshold number of IO traces are stored within the IO trace storage tier; and
in response to determining that at least the threshold number of IO traces are stored within the IO trace storage tier, offloading at least a portion of the plurality of IO traces to a client computing device that provided an IO request to the storage system.

9. The computer program product of claim 8, wherein each IO trace of the plurality of IO traces includes information associated with processing an IO request on the storage system.

10. The computer program product of claim 8, wherein the IO trace storage tier is a ring buffer.

11. The computer program product of claim 10, wherein determining whether at least the threshold number of TO traces are stored within the TO trace storage tier includes defining a trace position within the ring buffer of the TO trace storage tier.

12. The computer program product of claim 11, wherein the operations further comprise:
updating the trace position within the ring buffer in response to storing the plurality of TO traces within the TO trace storage tier.

13. The computer program product of claim 10, wherein determining whether at least the threshold number of TO traces are stored within the TO trace storage tier includes defining a dump position within the ring buffer of the TO trace storage tier.

14. The computer program product of claim 13, wherein the operations further comprise:
updating the dump position within the ring buffer in response to offloading the at least a portion of the plurality of TO traces to the client computing device.

15. A computing system comprising:
a memory; and
a processor configured to allocate a portion of a storage system for storing input/output (TO) traces, thus defining an TO trace storage tier, wherein the processor is further configured to store a plurality of TO traces within the TO trace storage tier, wherein allocating the TO trace storage tier includes adjusting a size of the TO trace storage tier based upon, at least in part, one or more predicted TO loads for the storage system, wherein the processor is further configured to determine whether at least a threshold number of TO traces are stored within the TO trace storage tier, and wherein the processor is further configured to, in response to determining that at least the threshold number of TO traces are stored within the TO trace storage tier, offload at least a portion of the plurality of TO traces to a client computing device that provided an TO request to the storage system.

16. The computing system of claim 15, wherein each IO trace of the plurality of IO traces includes information associated with processing an IO request on the storage system.

17. The computing system of claim 15, wherein the IO trace storage tier is a ring buffer.

18. The computing system of claim 17, wherein determining whether at least the threshold number of IO traces are stored within the IO trace storage tier includes defining a trace position within the ring buffer of the IO trace storage tier.

19. The computing system of claim 18, wherein the processor is further configured to:
update the trace position within the ring buffer in response to storing the plurality of IO traces within the IO trace storage tier.

20. The computing system of claim 17, wherein determining whether at least the threshold number of IO traces are stored within the IO trace storage tier includes defining a dump position within the ring buffer of the IO trace storage tier.

* * * * *